United States Patent
Kang et al.

(10) Patent No.: US 8,204,685 B2
(45) Date of Patent: Jun. 19, 2012

(54) NAVIGATION DEVICE AND ROAD LANE RECOGNITION METHOD THEREOF

(75) Inventors: Wooyong Kang, Daejeon (KR);
Eunsung Lee, Daejeon (KR);
Moonbeom Heo, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 32 days.

(21) Appl. No.: 13/098,161

(22) Filed: Apr. 29, 2011

(65) Prior Publication Data

US 2011/0320121 A1     Dec. 29, 2011

(30) Foreign Application Priority Data

Jun. 25, 2010   (KR) ........................ 10-2010-0060314

(51) Int. Cl.
*G01C 21/30*     (2006.01)

(52) U.S. Cl. ........ 701/447; 701/445; 701/446; 701/469; 701/484; 340/995.25; 340/995.28

(58) Field of Classification Search ............ 701/41, 701/96, 209, 213, 214, 215, 301; 340/435, 340/436, 901, 902, 995.25, 995.28; 382/104
See application file for complete search history.

(56) References Cited

U.S. PATENT DOCUMENTS

| | | | | |
|---|---|---|---|---|
| 6,023,653 A * | 2/2000 | Ichimura et al. | ............ | 701/208 |
| 6,173,232 B1 * | 1/2001 | Nanba et al. | ............ | 701/209 |
| 6,560,535 B2 * | 5/2003 | Hohman et al. | ............ | 701/213 |
| 6,850,841 B1 * | 2/2005 | Casino | ............ | 701/208 |
| 7,302,342 B2 * | 11/2007 | Kobayashi et al. | ............ | 701/207 |
| 7,463,974 B2 * | 12/2008 | Morita et al. | ............ | 701/207 |
| 7,471,212 B2 * | 12/2008 | Krautter et al. | ............ | 340/901 |
| 7,647,174 B2 * | 1/2010 | Kwon | ............ | 701/214 |
| 7,653,482 B2 * | 1/2010 | Sumizawa | ............ | 701/200 |
| 7,885,730 B2 * | 2/2011 | Kaufmann et al. | ............ | 701/1 |
| 7,962,282 B2 * | 6/2011 | Fujita et al. | ............ | 701/209 |
| 2003/0187560 A1 * | 10/2003 | Keller et al. | ............ | 701/50 |
| 2005/0065721 A1 * | 3/2005 | Herrtwich et al. | ............ | 701/207 |
| 2008/0021638 A1 * | 1/2008 | Kobayashi | ............ | 701/208 |

FOREIGN PATENT DOCUMENTS

| | | |
|---|---|---|
| JP | 1999-190771 A | 7/1999 |
| JP | 2007-192582 A | 8/2007 |
| JP | 2008-196968 A | 8/2008 |
| KR | 1020050012997 A | 2/2005 |
| KR | 10-0550433 | 2/2006 |

OTHER PUBLICATIONS

J. Du and M. Barth, "Bayesian Probabilistic Vehicle Lane Matching for Link-Level In-Vehicle Navigation," In Proc. IEEE Intelligent Vehicles Symposium, 2006, pp. 522-527.*

* cited by examiner

*Primary Examiner* — Thomas G. Black
*Assistant Examiner* — Peter D Nolan

(57) ABSTRACT

Provided is a road lane recognition method in a navigation device, which can differentiate a road lane occupied by a vehicle running on bidirectional lanes, including estimating a vehicle location based on satellite signal received from a carrier-based navigation satellite system and correction information received from a master station; determining a drive direction of the vehicle using vehicle location information and road lane information stored in a digital map; for each road lane in the road lane information, calculating a distance between a center line of the respective road lane and the vehicle location using the vehicle location information and the road lane information; and determining the road lane having a minimum value among the calculated distances as a drive lane.

1 Claim, 5 Drawing Sheets

NAVIGATION DEVICE AND ROAD LANE RECOGNITION METHOD THEREOF

CROSS-REFERENCE(S) TO RELATED APPLICATIONS

The present invention claims priority of Korean Patent Application No. 10-2010-0060314, filed on Jun. 25, 2010, which is incorporated herein by reference.

BACKGROUND OF THE INVENTION

1. Field of the Invention

The present invention relates to a navigation device which can recognize a road lane of a running vehicle, and a road lane recognition method thereof.

2. Description of Related Art

Generally, a navigation device is to provide route information to the driver's destination. A driver can see a map displayed on a terminal of a navigation system or listen to voice message while driving a vehicle. The navigation device functions to combine location information using GNSS (global navigation satellite system) and geographic data of a digital map and display a vehicle position on a road displayed on the map.

However, a conventional navigation device can not indicate information about a precise road lane occupied by the vehicle. That is, the conventional navigation device can guide only a point of time when the vehicle turns left or right on a route to a destination, but cannot guide the route on the basis of the vehicle's drive position by road lane. For example, in case that the vehicle which intends to turn left runs on other lanes except the first lane, the conventional navigation device does not inform of lane change. Therefore, there is inconvenience in that a driver has to change the lane after determining the vehicle location and the actual road lane occupied by the vehicle.

In order to solve the inconvenience, there has been proposed various methods such as a road lane recognition method using RFID (radio frequency identification) sensors laid under the road, and a road lane recognition method using cameras.

However, in case of the road lane recognition method using RFID, since the RFID sensors should be laid under all roads, this method has some problems such as construction difficulties and maintenance costs. Further, in case of RFID using communication network, there is also another problem that a RFID reading rate may be deteriorated according to ambient climate conditions and vehicle speeds.

In case of the road lane recognition method using cameras, this method has been mainly developed as a lane departure warning system, and thus it can only recognize the road lane but cannot recognize an absolute lane on which the vehicle is running. Furthermore, in case that it is foggy or snowing heavily, it is impossible to recognize the road lane.

SUMMARY OF THE INVENTION

An embodiment of the present invention is directed to providing a road lane recognition method using data of a digital map and navigation satellite information received from a navigation satellite system and a master station, and a navigation device using the same.

To achieve the object of the present invention, the present invention provides a road lane recognition method including estimating a vehicle location based on a satellite signal received from a carrier-based navigation satellite system and correction information received from a master station; determining a drive direction of the vehicle using vehicle location information and road lane information stored in a digital map; for each road lane in the road lane information, calculating a distance between a center line of the respective road lane and the vehicle location using the vehicle location information and the road lane information; and determining the road lane having a minimum value among the calculated distances as a drive lane.

Preferably, the satellite signal received from the navigation satellite system are provided in the form of carrier waves.

Preferably, the road has bidirectional lanes. In this case, the road lane recognition method further includes determining a drive direction of the vehicle using the vehicle location information and the road lane information of the digital map. Herein, the determining of the drive direction is performed before the calculating of the distances.

Preferably, the road lane recognition method further includes determining whether the vehicle location is within a road range having one drive direction among the bidirectional road lanes, before calculating the distances. Herein, if the vehicle is within the road range, the calculating of the distances and the determination of the road lane having the minimum value among the calculated distances as the drive lane are carried out.

Preferably, the calculating of the distances and the determination of the road lane having the minimum value among the calculated distances as the drive lane are not carried out, if the vehicle is deviated from the road range, and if the vehicle is within one direction of the road range, a first lane is determined as the drive lane, and if the vehicle location is within the other direction of the road range, a last lane is determined as the drive lane.

According to the present invention as described above, since the road lane recognition method in the navigation device utilizes only the signals of navigation satellite system, correction information of the master station and geographic data of the digital map, there is no restriction in the installation and maintenance aspects, and also it is possible to accurately perform the lane differentiation regardless of the ambient climate conditions.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
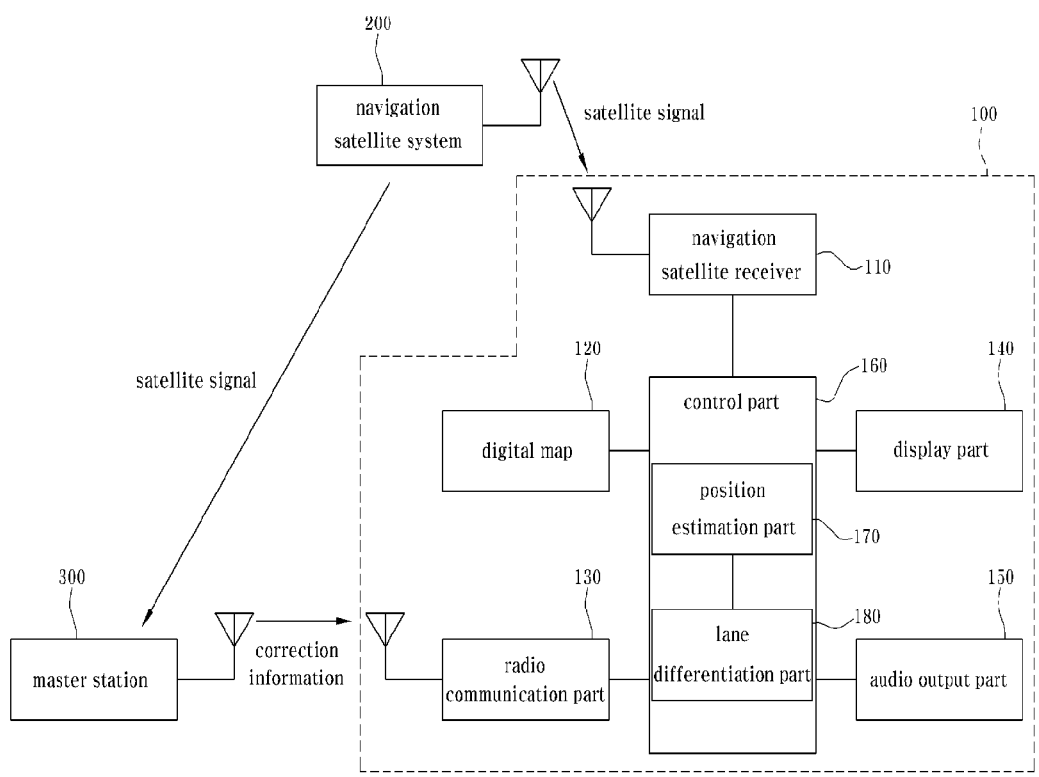
FIG. 1 is a block diagram of a navigation device according to an embodiment of the present invention.
Figure 2:
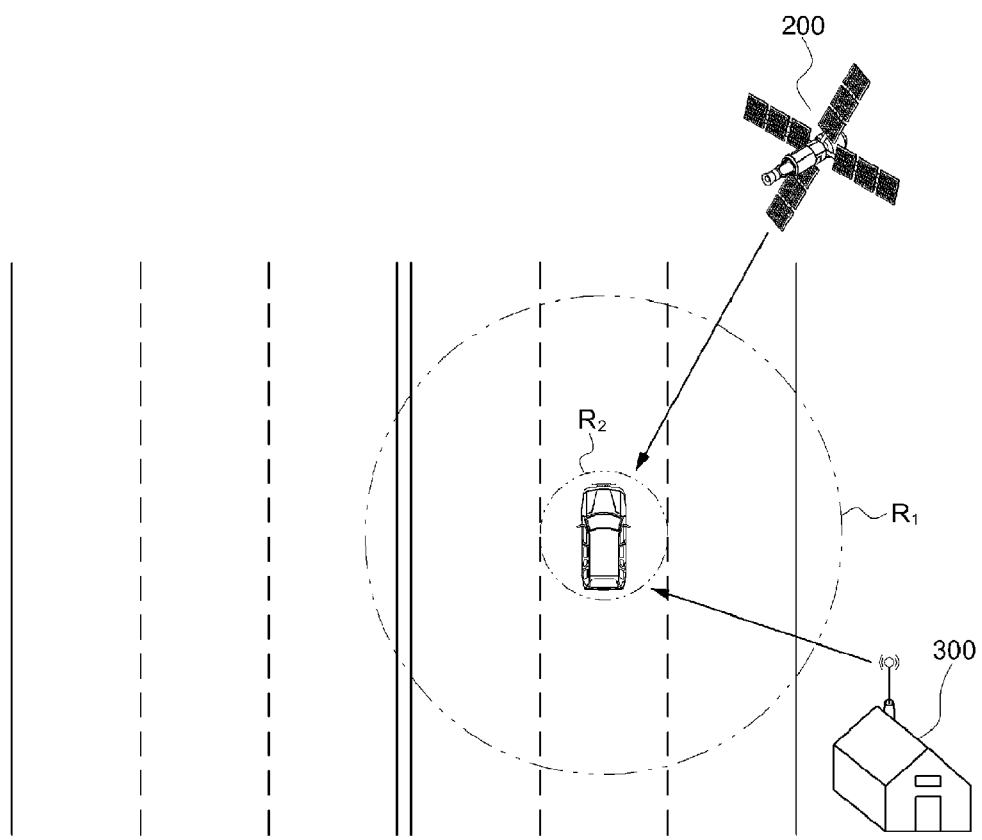
FIG. 2 is a conceptual view showing an operation of the navigation device of FIG. 1.

FIG. 1 is a block diagram of a navigation device according to an embodiment of the present invention, and FIG. 2 is a conceptual view showing an operation of the navigation device of FIG. 1.

Referring to FIG. 1, a navigation device 100 includes a navigation satellite receiver 110, a digital map 120, a radio communication part 130, a display part 140, an audio output part 150, a control part 160 and the like. These elements may be the same as those in a navigation terminal.

The navigation satellite receiver 110 is to receive satellite signal transferred from a navigation satellite system 200. In general, the navigation satellite receiver 110 may be called as a GPS module.

The digital map 120 is to store GIS (geographic information system) data with respect to roads and major landmarks around the roads. The digital map 120 is generally formed into a memory. The present invention utilizes a precise digital map having road lane information of various roads having multiple lanes.

The radio communication part 130 receives correction information from a master station 300 in order to estimate an accurate vehicle location. The master station 300 transfers to the radio communication part 130 a compensation error value calculated by comparing an accurately measured position of the master station 300 and a satellite signal received from the navigation satellite system 200.

The display part 140 and the audio output part 150 output the information in the form of visual or audio information. For example, the display part 140 outputs the geographic information stored in the digital map 120 in the form of a map and also indicates a route on the map. The audio output part 150 outputs audio information relevant to straight movement, left turn and right turn.

The control part 160 functions to control the display part 140 and the audio output part 150 on the basis of the data transferred from the navigation satellite receiver 110, the radio communication part 130 and the like.

The navigation device 100 of the present invention includes a position estimation part 170 which estimates a vehicle location on the basis of the satellite signal from the navigation satellite system 200 and the correction information received from the master station 300, and a lane differentiation part 180 which differentiates a road lane occupied by a vehicle on the basis of the vehicle location estimated by the position estimation part 170 and the data of the digital map. The position estimation part 170 and the lane differentiation part 180 are in the form of an algorithm or a program, and they can be integrally formed with the control part 160 as shown in the embodiment. However, the present invention is not limited to the embodiment. That is, the position estimation part 170 and the lane differentiation part 180 may be separately formed from the control part 160.

The navigation device 100 of the present invention utilizes DGNSS (differential global navigation satellite system). In other words, the master station 300 which previously knows the vehicle location information receives the satellite signal, compensates factors that cause errors and then transfers the corrected information to the navigation device 100, thereby accurately estimating the vehicle location.

The satellite signal from the navigation satellite system 200 is provided in the form of a carrier wave and a code to the navigation device 100.

In case of the code, the navigation satellite signal 100 itself can estimate the vehicle location, but it has a relatively large location error of 15 m or so. In a general navigation device, the vehicle location is estimated by only using the code information. Further, code-based DGNSS has a location error of 2~3 m.

In case of the carrier wave, the navigation device 100 itself cannot estimate the vehicle location due to integer ambiguity. In carrier-based DGNSS, since it is possible to remove a common error using differentials, the integer ambiguity is calculated by various methods in order to estimate the vehicle location. In this case, it is possible to reduce the location error by an extent of a few dozen cm to a few mm, and thus it is possible to accurately estimate the vehicle location information. The present invention utilizes the carrier-based DGNSS which can obtain the accurate vehicle location information allowing for lane differentiation.

FIG. 2 shows a bidirectional six-lane road. In FIG. 2, R1 is an error range (accuracy) of location estimated by the general DGNSS, and R2 is an error range of location estimated by the carrier-based DGNSS used in the present invention.

Figure 3:
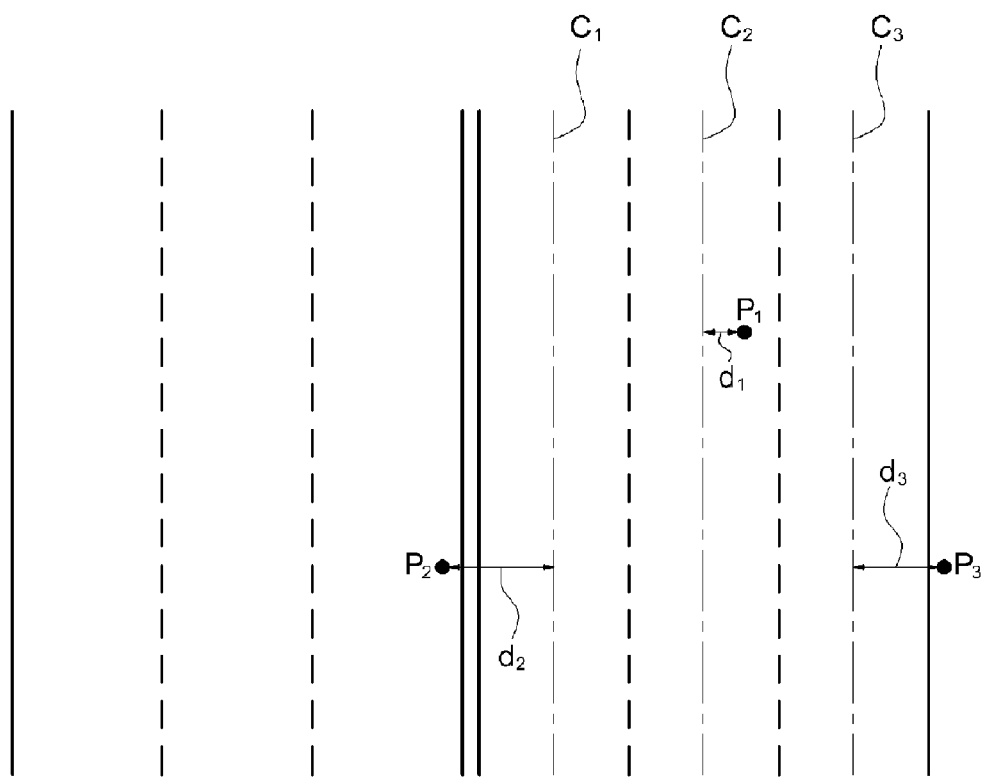
FIG. 3 is a conceptual view showing a road lane recognition method in the navigation device.
Figure 4:
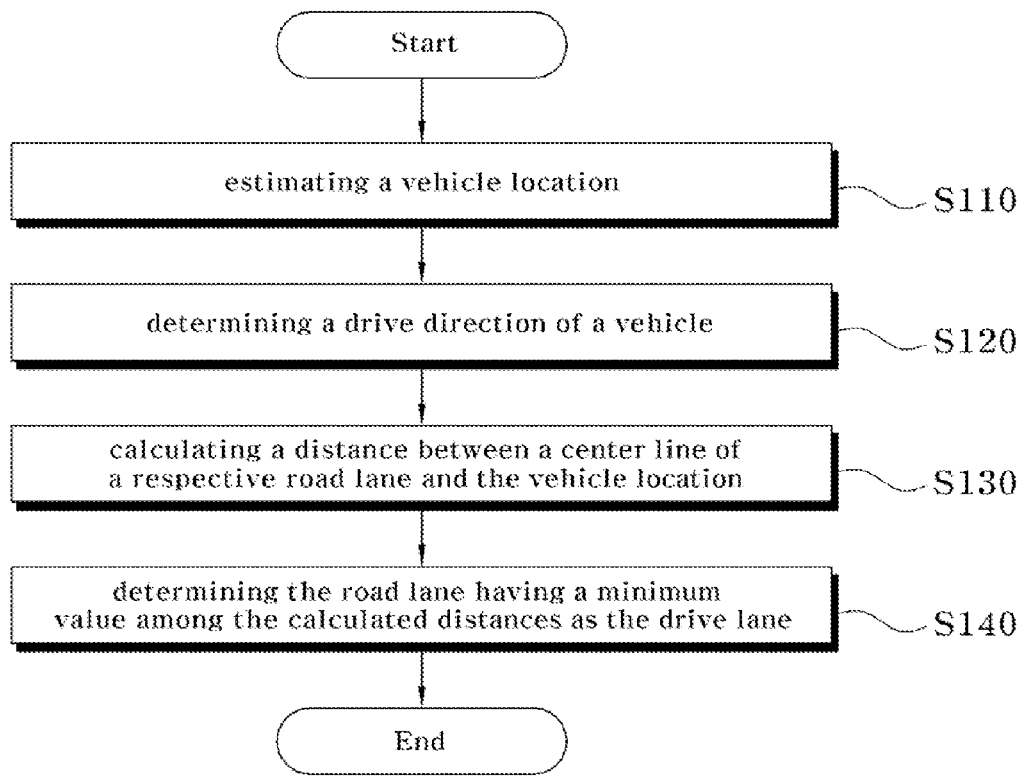
FIG. 4 is a flow chart of a road lane recognition method according to an embodiment of the present invention.

FIG. 3 is a conceptual view showing a road lane recognition method in the navigation device, and FIG. 4 is a flow chart of a road lane recognition method according to an embodiment of the present invention.

Firstly, the position estimation part 170 estimates the vehicle location based on the satellite signal of the navigation satellite system 200 and the correction information of the master station 300 (S110). FIG. 3 shows the estimated vehicle locations P1, P2 and P3 indicated on the bidirectional six-lane road.

And the position estimation part 170 determines a drive direction of the vehicle using the vehicle location information and the road lane information stored in the digital map 120 (S120). The drive direction can be determined by differential of past location information.

The step S120 of determining the drive direction is needed in case of the road including the bidirectional lanes. It is possible to halve an extent of lane differentiation. Further, in case of the location P2 in which the error range of vehicle location is extended over two opposite directional lanes, the step S120 serves as a basis for determining a drive lane from the two opposite directional lanes. Since the step S120 is not needed in case of a one-directional lane road, it is not an essential process. Therefore, the step 120 may be set so as to be performed only in the bidirectional lane road.

The lane differentiation part 180, for each road lane in the road lane information, calculates a distance between a center line of the respective road lane and the vehicle location using the road lane information of the digital map 120 and the estimated vehicle location (S130). In FIG. 3, C1, C2 and C3 are imaginary lines that respectively indicate each center line of first second and third lanes.

In the lane differentiation part 180, determines the road lane having a minimum value among the calculated distances as a drive lane (S140).

Referring to FIG. 3, in case that the vehicle location estimated by the position estimation part 170 is P1, when calculating the distances between the location P1 and the center line C1, C2, C2 of each lane, a distance d1 between P1 and C2 is the minimum value. Therefore, the second lane having the center line C2 is determined as the drive lane.

In case that the vehicle location estimated by the position estimation part 170 is P2, if the drive direction is determined as an upper direction of FIG. 3 in the step S120, the opposite lanes are excluded from the consideration. That is, since the step S120 of determining the drive direction is carried out before the step S130 of calculating the distances, it is possible to halve the extent of lane differentiation.

When calculating the distances between P2 and the center line C1, C2, C2 of each lane, a distance d2 between P2 and C1 is the minimum value, and thus the first lane having the center line C1 is determined as the drive lane.

In the same manner, if the vehicle location estimated by the position estimation part 170 is P3, a distance d3 is the minimum value, and thus the third lane is determined as the drive lane.

Figure 5:
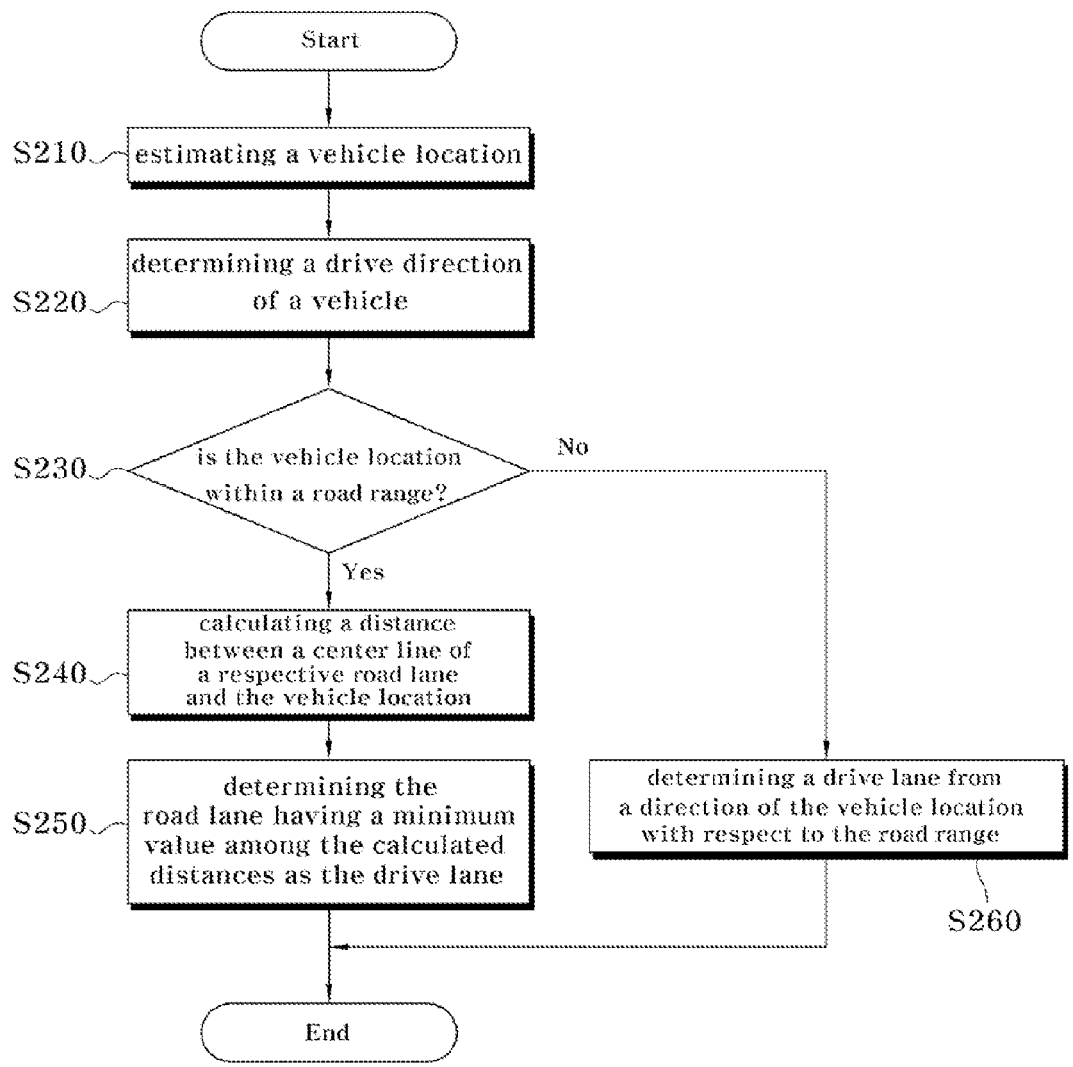
FIG. 5 is a flow chart of a road lane recognition method according to another embodiment of the present invention.

FIG. 5 is a flow chart of a road lane recognition method according to another embodiment of the present invention.

According to the embodiment of the present invention, after the vehicle location is estimated in the same manner as in the previous embodiment (S210), the drive direction is determined (S220). Herein, the step S220 of determining the drive direction is not an essential process.

Then, it is determined whether the estimated vehicle location is within a road range having one drive direction among the bidirectional road lanes (S230). Herein, the road range means a collective range of lanes having one drive direction among the bidirectional road lanes. That is, the road range is corresponded to a portion from a center line of the road to a starting point of a shoulder of the road.

In case of P1 of FIG. 3, the estimated vehicle location is within the road range having the upper direction. However, in case of P2 and P3, the estimated vehicle location is deviated from the road range having the upper direction.

In case of P1 in which the estimated vehicle location is within the road range, a step S240 of calculating the distances and a step S250 of determining the drive lane having the minimum value are performed in the same manner as in the previous embodiment. In case of P1, a distance d1 between P1 and C2 is the minimum value, and thus the second lane having a center line C2 is determined as the drive lane.

However, in case of P2 and P3 in which the estimated vehicle is deviated from the road range, the drive lane is determined on the basis of the drive direction and a direction of the vehicle location with respect to the road range (S260). In other words, if the vehicle location is within one direction of the road range, a first lane is determined as the drive lane, and if the vehicle location is within the other direction of the road range, a last lane is determined as the drive lane.

In case of P2 and P3, if the drive direction is determined as the upper direction of FIG. 3, the opposite lanes are excluded from the consideration.

And if the estimated vehicle location is located at the left of the road range, the first lane is determined as the drive lane, and if the estimated vehicle location is located at the right of the road range, the last lane is determined as the drive lane. Since P2 is located at the left of the road range, the first lane is determined as the drive lane, and since P3 is located at the right of the road range, the third lane is determined as the drive lane.

According to the present invention, if a restrictive condition for firstly determining whether the vehicle location estimated before the calculation of the distances is within the road range is added, it is possible to accurately perform the lane differentiation even when the error occurs, thereby enhancing reliability for the lane differentiation.

The display part 140 visually indicates a state that the vehicle is run on the corresponding road lane based on the results of the lane differentiation. Furthermore, the display part 140 and the audio output part 150 outputs the guide information about the lane change on the basis of the results of the lane differentiation. For example, if the vehicle intending to turn left is not on the first lane, it is possible to advise the lane change.

According to the present invention as described above, since the road lane recognition method in the navigation device utilizes only the satellite signal of navigation satellite system, correction information of the master station and geographic data of the digital map, there is no restriction in the installation and maintenance aspects, and also it is possible to accurately perform the lane differentiation regardless of the ambient climate conditions.

The navigation device and the road lane recognition method are not limited to the above-mentioned embodiments. A part or the whole part of the embodiments may be selectively combined with each other.

While the present invention has been described with respect to the specific embodiments, it will be apparent to those skilled in the art that various changes and modifications may be made without departing from the spirit and scope of the invention as defined in the following claims.

What is claimed is:

1. A road lane recognition method in a navigation device, which can differentiate a road lane occupied by a vehicle running on bidirectional lanes, comprising:
    estimating a vehicle location based on a satellite signal received from a carrier-based navigation satellite system and correction information received from a master station;
    determining a drive direction of the vehicle using vehicle location information and road lane information stored in a digital map;
    for each road lane in the road lane information, calculating a distance between a center line of the respective lane and the vehicle location using the vehicle location information and the road lane information;
    determining the road lane having a minimum value among the calculated distances as a drive lane; and
    determining whether the vehicle location is within a road range having one drive direction among the bidirectional road lanes, before calculating the distances,
    wherein the calculating of the distances and the determination of the road lane having the minimum value among the calculated distances as the drive lane are carried out, if the vehicle is within the road range,
    wherein the calculating of the distances and the determination of the road lane having the minimum value among the calculated distances as the drive lane are not carried out, if the vehicle is deviated from the road range,
    wherein, if the vehicle is within one direction of the road range, a first lane is determined as the drive line, and
    wherein, if the vehicle location is within the other direction of the road range, a last lane is determined as the drive line.

* * * * *